United States Patent [19]

Quinlan, Jr.

[11] Patent Number: 5,056,884
[45] Date of Patent: Oct. 15, 1991

[54] FIBER OPTIC LOAD SENSING DEVICE

[75] Inventor: Thomas J. Quinlan, Jr., Beach Haven Terrace, N.J.

[73] Assignee: Automatic Toll Systems, Inc., Teterboro, N.J.

[21] Appl. No.: 508,139

[22] Filed: Apr. 10, 1990

[51] Int. Cl.⁵ .............................................. G02B 6/26
[52] U.S. Cl. ...................................... 385/13; 385/32; 385/51
[58] Field of Search ............... 350/96.10, 96.13, 96.15, 350/96.16, 96.20, 96.29, 96.30, 96.33, 96.23

[56] References Cited

U.S. PATENT DOCUMENTS

| | | | |
|---|---|---|---|
| 4,443,700 | 4/1984 | Macedo et al. | 350/96.29 X |
| 4,455,465 | 6/1984 | Habeger | 200/86 R |
| 4,482,203 | 11/1984 | Stowe et al. | 350/96.15 |
| 4,488,040 | 12/1984 | Rowe | 350/96.29 X |
| 4,749,246 | 6/1988 | Epworth et al. | 350/96.15 |
| 4,795,232 | 1/1989 | Persson | 350/96.29 X |
| 4,830,461 | 5/1989 | Ishiharada et al. | 350/96.29 |
| 4,927,232 | 5/1990 | Griffiths | 350/96.29 |

*Primary Examiner*—John D. Lee
*Attorney, Agent, or Firm*—Theodore F. Shiells

[57] ABSTRACT

A transverse load sensitive optical treadle switch. The switch includes a deformable longitudinal housing and a fiber optic assembly positioned within the housing. The fiber optic assembly includes an optical fiber having a first end and a second end, the optical fiber being subject to bending upon application of a transverse load to said housing. Means for mounting the optical fiber in the housing so as to permit bending of the fiber in response to application of a transverse load to said housing are provided, the degree of bending being sufficient to cause a significant decrease in passage of light through said fiber when said fiber is bent. Means permitting introduction of light into said optical fiber at the first end of the optical fiber and means for permitting the exit of light from the second end are also provided.

21 Claims, 4 Drawing Sheets

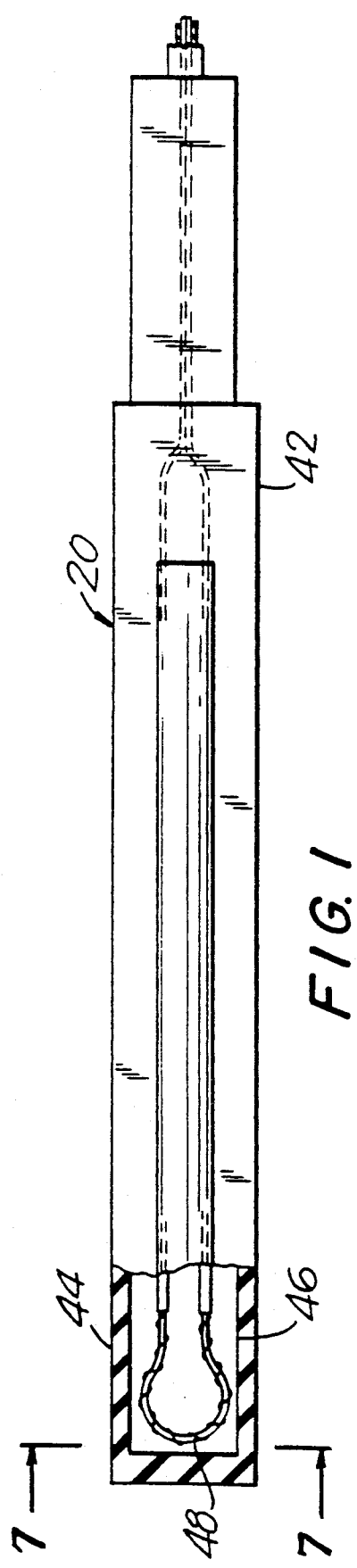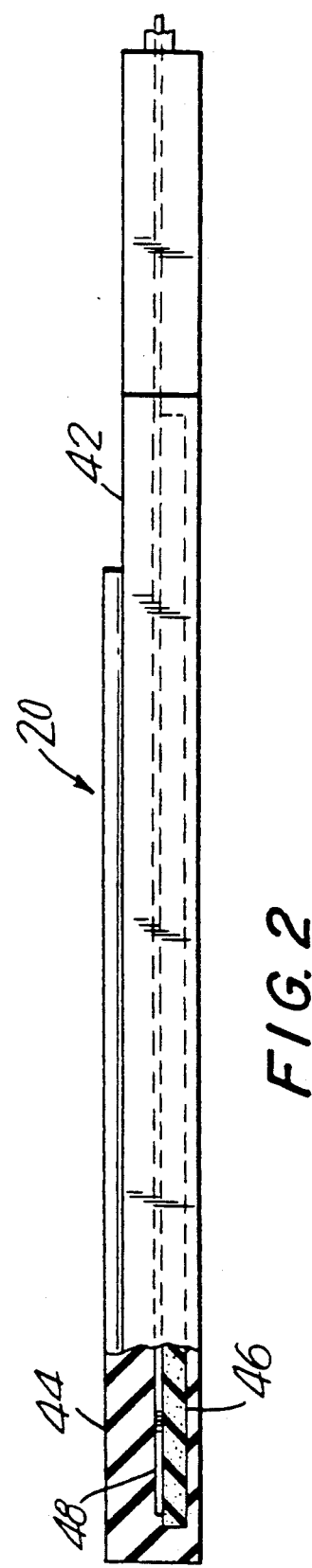

FIBER OPTIC LOAD SENSING DEVICE

FIELD OF THE INVENTION

The present invention relates generally to switches for sensing the passage of a vehicle over a treadle, and in particular to a novel treadle switch design utilizing fiber optics as the sensing means.

BACKGROUND OF THE INVENTION

In toll road and other applications where the passage of a vehicle is sensed, it is often required to quantify the number of axles associated with a vehicle. This is generally accomplished by means of weight sensitive treadles placed across the roadway.

Conventional treadle designs commonly employ a treadle switch unit consisting of an elastomeric envelope housing an electrical sensing unit. In one common form, the interior of the envelope is provided with spaced contact strips defined by upper and lower interior surfaces which are normally separated by air recesses running longitudinally. When the weight of a vehicle wheel is upon the treadle, it deforms the envelope and causes the contacts to engage each other (electrically) to complete a circuit. The electrical sensing means for the treadle switch may, to like effect, consist of a variable resistor which changes its electrical resistance in response to stress caused by deformation or a piezoelectric sensor which provides a voltage in response to stress. The important feature common to these electrical sensing means is that the sensor produces a readily detectible change in the current and/or voltage in response to weight applied to the unit.

These treadle switch designs all rely upon electrical current flow and are therefore particularly subject to failure due to intrusion of moisture, salts and/or other contaminants. Accordingly, the lifetime of such electrically sensing treadle designs is unduly limited. Because these treadles are typically in traffic lanes, replacement causes undesirable disruption of traffic in addition to expense.

This invention relates to a completely sealed treadle switch utilizing a fiber optic sensor of the intrinsic type. For comparison, with extrinsic fiber optic sensors, light leaves the fiber and is blocked or reflected before going back into the fiber optic system. Thus, extrinsic optical sensors have the same disadvantages as photo-electric controls in that they ar affected by dirt, contamination and mechanical vibration. By contrast, with an intrinsic fiber optic sensor, the light is processed (i.e., is detectably altered due to stress) as it passes along the fiber. This can be in the form of phase angle change or speckle pattern detection, or other attenuation.

OBJECTS OF THE INVENTION

Accordingly, it is an object of the present invention to provide a treadle switch design which overcomes the foregoing disadvantages of treadle designs with electrical sensors or extrinsic optical sensors.

In particular, it is an object of the present invention to provide a treadle switch having a fiber optic sensor which employs light rather than electrical current flow for its sensing operation and is therefore less subject to failure due to presence of moisture, salts and other contaminants than electrical sensors.

It is a further object of the present invention to provide a treadle which is simple, robust, long lived, and has a high inherent reliability.

SUMMARY OF THE INVENTION

In accordance with a preferred embodiment of the present invention, a transverse load sensitive optical switch is provided which includes a longitudinal housing having at least one deformable side and a fiber optic assembly positioned within the housing. The fiber optic assembly includes an optical fiber having a first end and a second end, the optical fiber being subject to bending upon application of a transverse load to said housing. The fiber optic assembly also includes means for mounting the optical fiber in the housing so as to permit bending of the fiber in response to application of a transverse load to said housing, the degree of bending being sufficient to cause a significant decrease in passage of light through the fiber when the fiber is bent. Mean permitting introduction of light into said optical fiber at the first end of the optical fiber and means for permitting the exit of light from the second end are also provided.

In a preferred aspect of this embodiment, the means for mounting the optical fiber include a plurality of fulcrum means positioned along the length of the optical fiber at intervals sufficient to permit sufficient bending of the optical fiber between the fulcrums in response to a transverse load applied to the housing to substantially alter the amount of light transmitted through the optical fiber.

In another preferred embodiment of the present invention, the transverse load sensitive optical switch comprises a longitudinal housing having at least one deformable side and a fiber optic assembly positioned within the housing. The fiber optic assembly includes a graded optical fiber having a first end and a second end longitudinally positioned in said housing so as to be subject to bending upon application of a transverse load to the housing, the fiber having an inner core of a material having a first refractive index and an outer layer of a material having a second refractive index which is lower than the first refractive index. Means for mounting the optical fiber in the housing adapted to permit bending of the fiber in response to application of a transverse load to the housing, the degree of bending being sufficient to cause a significant increase in passage of light from said core to said sleeve while said fiber is bent, are also provided. Means permitting the introduction of light into the optical fiber at the first end of the optical fiber and for permitting the exit of light from the second end are also provided.

In accordance with a further aspect of this embodiment, the means for mounting the optical fiber preferably comprises a spiral fiber wound around the optical fiber, the spiral fiber having adjacent winds spaced apart from one another a predetermined distance averaging at least in the range of twice the diameter of the optical fiber so as to permit sufficient bending of the optical fiber between the winds of the spiral fiber in response to a transverse load applied to the housing to substantially alter the amount of light transmitted through the optical fiber. The turn of the wound fiber functions essentially as fulcrums to facilitate bending of the optical fiber.

Advantageously, the switch assembly further comprises a sleeve surrounding the optical fiber and the spiral fiber to keep said spiral fiber wound around said optical fiber and to permit the sufficient bending of the optical fiber. Preferably, the sleeve is made of a material which is deformable but relatively stiffer than at least one deformable side of the housing to facilitate bending of the optical fiber between the winds of the spiral fiber when a transverse load is applied to the housing.

In a yet further embodiment of the present invention, a treadle switch unit for vehicular traffic adapted to be mounted transversely on a roadway is provided which comprises a longitudinal elastomeric envelope; a portion of foam rubber embedded within the envelope; and a fiber optic cable supported by the foam rubber within the elastomeric envelope and running substantially the length of the treadle switch unit. The fiber optic cable has a first end adapted to be connected to a signal source of light and a second end adapted to be connected a receiving unit, further including means permitting deformation of said fiber optic cable within the envelope when a transverse load is applied to the envelope sufficient to significantly alter the amount of light transmitted through the fiber optic cable.

BRIEF DESCRIPTION OF THE DRAWINGS

These and other objects, features and advantages of the present invention will be apparent to those skilled in the art in view of the following description and drawings, wherein:

FIG. 1 is a plan view of a treadle unit employing the fiber optic switch of the present invention, with a section broken away;

FIG. 2 is an elevation view of the treadle unit depicted in FIG. 1, with a section broken away;

DETAILED DESCRIPTION

Figure 8:
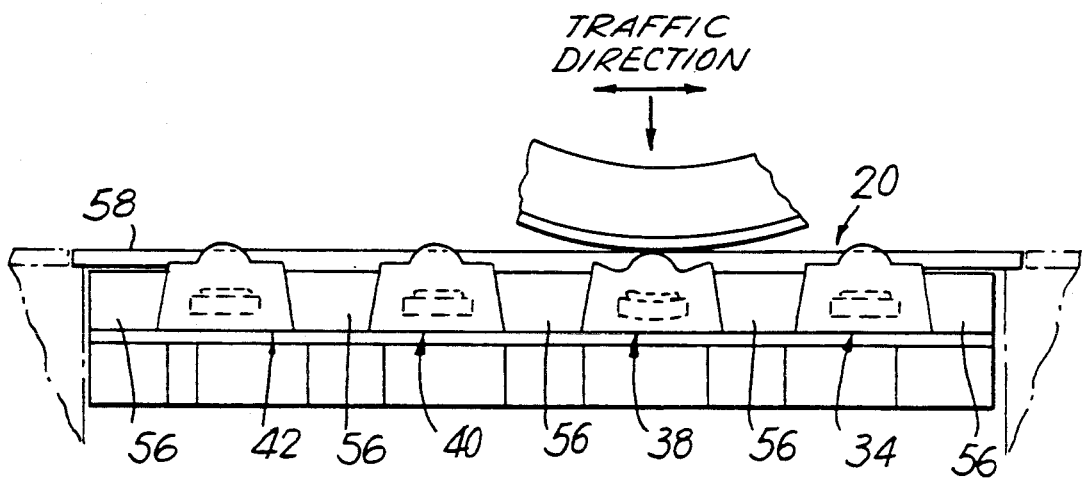
FIG. 8 is an end elevation view depicting the treadle unit depicted in FIG. 1 and FIG. 2, mounted in a support frame including a grouping of four treadle switches.

Turning now to the drawings in detail, and initially to FIGS. 1 and 2 thereof, a treadle switch unit 20 in accordance with a preferred embodiment of the present invention is depicted. This treadle switch device is generally designated as designed for vehicular traffic, and is adapted to be mounted transversely on a roadway. As depicted in FIG. 8, this treadle unit can be mounted in a fixed frame and can be used singularity or in quantity up to and including (4) four treadle switch units 36, 38, 40 and 42, or more.

Figure 7:
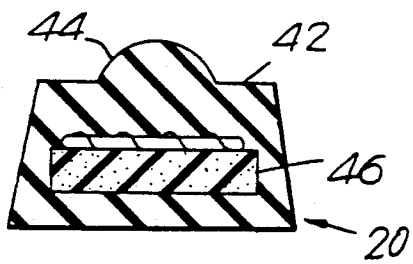
FIG. 7 is a cross-sectional view of the treadle unit depicted in FIG. 1.
Figure 9:
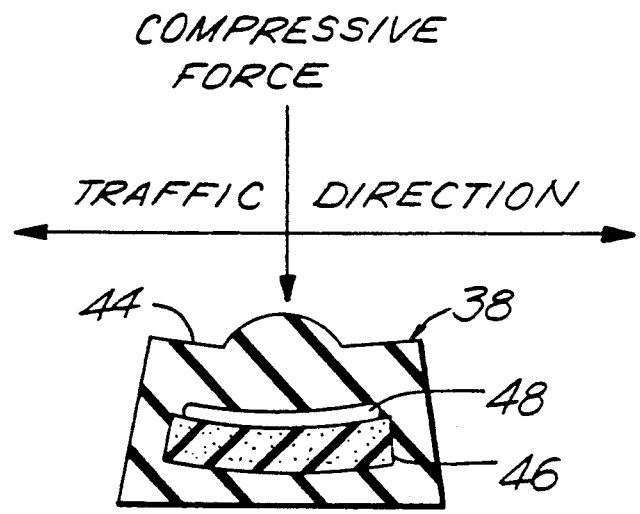
FIG. 9 is a cross-sectional view of a single treadle unit depicted in FIGS. 7 and 8, shown depressed and distorted under a compressive force similar to that as shown applied in FIG. 8.
Figure 10:
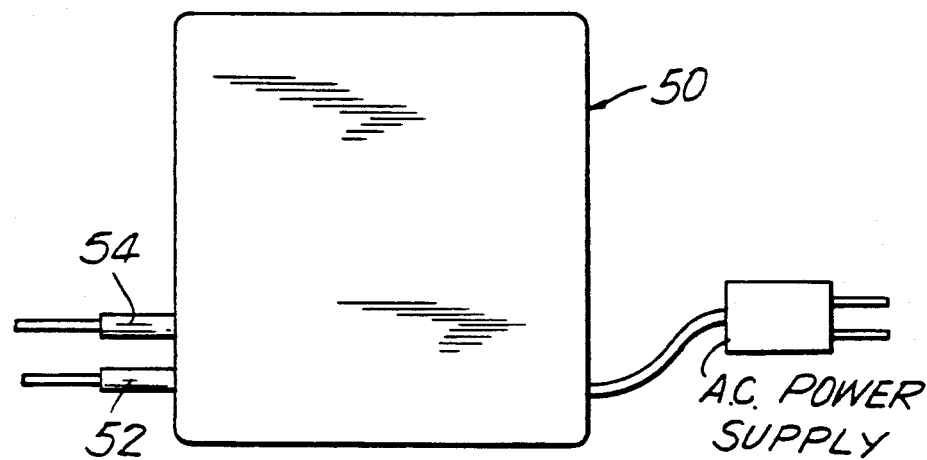
FIG. 10 is a schematic depiction of a light signal source and light signal receiving unit adapted for use in conjunction with the present invention.

The treadle switch unit of the present invention is shown particularly in the cross-sectional view thereof of FIG. 7 of the drawings and comprises an envelope preferably of an elastomeric, such as a rubber or urethane, generally designated as 44. The fiber-optic cable is bonded to a base 46 of a soft foam rubber insert supported by the elastomeric envelope of rubber or urethane, which advantageously serves as a deformable side of the envelope. This inner foam rubber allows the compression and bending of the fiber optic cable when compressive force is applied as shown in FIGS. 8 and 9. The fiber optic cable shown in FIGS. 1 and 2 is an intrinsic fiber optic cable, 48, bonded to a support base of foam rubber 46 and connected to the electronic control sending and receiving unit 50 through optical connectors 52 and 54.

FIGS. 1 and 2 illustrate the treadle 42 in a singular mode and further illustrate the construction of a rubber-urethane envelope having a specifically designed contour as shown in FIGS. 7, 8, and 9. This contour allows for rapid mounting on the treadle frame assembly 34, locked in place by the wedge locking bars, 56, and secure and protected by the top cover plates, 58.

The fiber optic treadle 20 is a pressure sensitive device molded in a rubber compound. It is installed in a frame assembly 34 which lays flush with the road surface and counts the number of axles on each vehicle. The fiber optic portion of the treadle consists of an optical fiber 22 having a "glass" core 24 with a high refractive index (bending of wave of light as it passes from one medium into another) and an outer layer 26 having a lower refractive index. The fiber also includes a protective hard acrylic coating 31. Any light which deviates from the center core is bent back into the center by the lower refractive index of the outer layer. If the fiber is bent at a point or points along its length, some light is guided out of the core into the outer layer where it is dispersed. Light passing down the fiber is virtually switched off by pressure applied the spiral 30. An infra red light (led) is used to send light into the sensing fiber.

Figure 3:
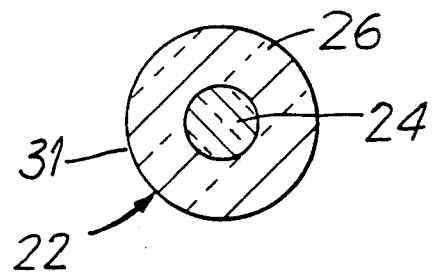
FIG. 3 is an end sectional view of an optical fiber having an inner core of higher refractive index and an outer layer of lower refractive index employed in a preferred embodiment of the present invention.
Figure 4:
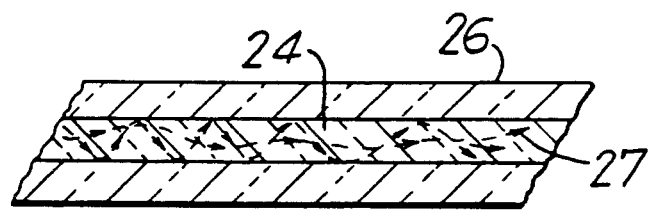
FIG. 4 is a sectional elevation view of the optic cable depicted in FIG. 3, in its unstressed state, schematically illustrating light passing through the core of the optic cable relatively unimpeded.

Turning now to FIG. 3, a preferred embodiment of the transverse load sensitive fiber optic switch of the present invention employing a graded optical fiber 22 is depicted. This graded optical fiber consists of a glass core 24 of high refractive index and an outer layer 26 having a lower refractive index. Any light which deviates from the center core is bent back into the center by the lower refractive index of the outer layer. This is shown in FIG. 4. When the fiber is bent, some of the light 27 will follow a path through the core, or follow other possible light paths or modes of transmission 29 as demonstrated in FIG. 6.

Figure 5:
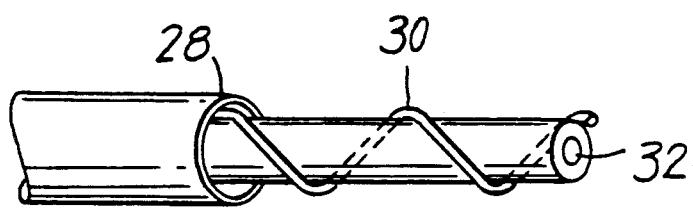
FIG. 5 is a perspective view, partially in section, of a portion of a fiber optic cable constructed in accordance with a preferred embodiment of the present invention.

To achieve this micro bending over short or long lengths of fiber, a plastic spiral 30 is used. Preferably, the spiral is wound around the optical fiber with the winding spaced apart a distance averaging at least in the range of twice the diameter of the optical fiber. This permits bending of the optical fiber to a degree sufficient to significantly decrease the amount of light transmitted through the optical fiber core, without damage to the optical fiber. This is then preferably covered with a sleeve 28 to hold the assembly together as shown in FIG. 5. The whole assembly is very flexible and can be taken round corners down to 25 mm radius.

Figure 6:
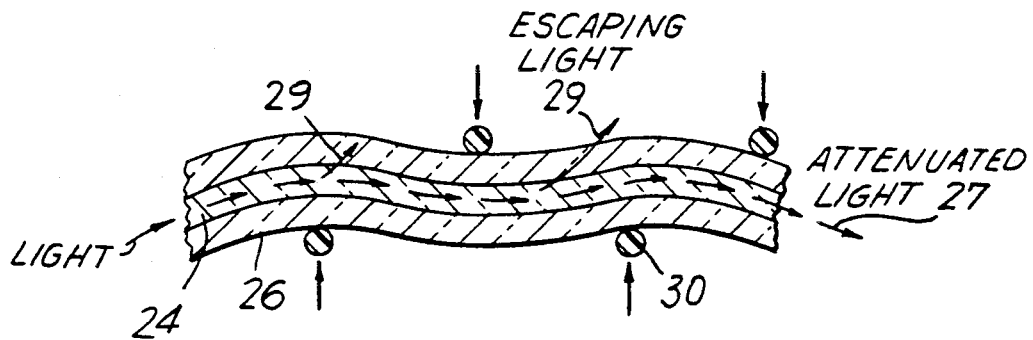
FIG. 6 is a sectional elevation view of the optic cable depicted in FIG. 3, in its stressed and bent state, schematically illustrating light exiting from the core of the fiber optic cable into the outer layer.

If the fiber is bent at certain points along its length, some light is guided out of the core 24 into the outer layer 26 where it is dispersed, as illustrated in FIG. 6. To the naked eye, light passing down the fiber appears virtually switched off by pressure applied to the spiral. In addition, the movement required to give this attenuation is only 0.04 mm. After this movement the fiber can be squeezed a further 0.1 mm before it is over-stressed. When operating over the normal attenuation range, the fiber has been tested to more than 8 million operations without any measurable change in the level of attenuation. Lastly, there is excellent linearity in the relationship of attenuation to applied force.

A light signal source and light signal receiving unit 50 with respective light supply and light return connections 54 and 52 to the fiber optic cable. Advantageously, an infra-red light emitting diode (LED) is used to launch light into the sensing fiber. The light intensity is sensed at the remote end using a photo detector. By comparing the output level of the photo detector with a reference, any change in the amount of light passing through the detector can be measured. The power supply to the LED is pulsed at 2 kHz for maximum light intensity. The pulse train is modified so that 1 in 11 is missed. The missed pulse is used to verify the control circuit integrity passing through the fiber.

The light intensity is sensed using a photo-detector and by comparing the output level of the photo detector with a reference, any change in the amount of light passing through the detector can be measured. The contacts are set to open when the signal drops below a threshold (action similar to on/off switch).

FIG. 8 depicts and assembly of four treadles constructed in accordance with the invention, three of which (treadles 36, 40 and 42) are in the free, or waiting (unstressed) state shown in FIG. 8. These treadles carry a pulsed signal light beam from the light power supply, 4, through the fiber optic cable and back to the receiving connection of the said light power supply, 4. Treadle 8 in FIG. 8 illustrates compression force bending the fiber optic cable. By knowing the output level of the infra-red light emitting diode (LED) any deviation in signal light will be measured by the detector. The voltage free contacts are set to open when the signal drops below a threshold. This gives a straight on/off sensor.

The structure and operation of the treadle switch unit and the improvement thereof over known treadle switch units is believed to be fully apparent from the above detailed description. It will be further apparent that changes may be made in the detailed structure of the improved treadle switch unit of the invention without departing from the spirit of the invention defined in the appended claims.

What is claimed is:

1. A treadle sensing device for vehicular traffic adapted to be mounted transversely on a roadway and to receive and sense a downward load of the type imparted by a vehicle wheel comprising
   a longitudinal elastomeric envelope having spaced apart longitudinal walls in a lengthwise region of said envelope adapted to receive said load;
   a portion of foam rubber embedded within said envelope;
   a fiber optic cable supported by said foam rubber within said region of said elastomeric envelope and running generally perpendicular to the direction of the load to be applied substantially the length of said region, said fiber optic cable having a first end adapted to be connected to a signal source of light and a second end adapted to be connected to a receiver;
   means permitting deformation of said fiber optic cable within said envelope when a transverse load of the type applied by a vehicle wheel is applied to said envelope sufficient to significantly alter the amount of light transmitted through said fiber optic cable; and
   means for preventing complete compression of said foam rubber where said fiber optic cable rests against said foam rubber during application of said load when said device is mounted on a roadway.

2. A load sensing device adapted to be mounted transversely on a roadway and to receive downwardly applied loads of the type imparted by an automotive vehicle wheel comprising
   a longitudinal envelope having spaced apart peripheral walls defining an interior space therebetween in a region of said envelope adapted to receive said load, said walls remaining substantially longitudinally parallel to one another substantially throughout the region of said envelope adapted to receive said load, at least one of said walls in said region having an elastically deformable portion having a first interior surface deflectable into said interior space towards an opposing second interior surface of one of said peripheral walls upon the application of said load to said envelope;
   a relatively soft compressible elastomeric insert embedded in said interior space of said envelope;
   a fiber optic cable longitudinally positioned within said interior space of said envelope and resting against said insert, said fiber optic cable comprising an optical fiber having a first end adapted to receive light and a second end adapted to permit the exit of said light, said fiber optic cable being subject to sufficent deformation into said insert upon deflection of said first interior surface caused by application of said load so as to permit localized bending of said optical fiber sufficient to substantially alter the light transmitted through the optical fiber; and
   means for preventing complete compression of said elastomeric insert where said fiber optic cable rests against said elastomeric insert during application of said load when said device is mounted on the surface of the roadway.

3. The load sensing device defined in claim 2, wherein said insert is a foam elastomeric.

4. The load sensing device defined in claim 2, wherein said fiber optic cable is bonded to said insert.

5. The load sensing device defined in claim 2, wherein said optical fiber has an inner core of a first refractive index and an outer layer of a second refractive index which is lower than said first refractive index, and wherein said first end adapted to receive light and said second end adapted to permit the exit of said light permits introduction and exit of light from said core of said optical fiber.

6. The load sensing device defined in claim 5, wherein said fiber optic cable is a self contained sleeved fiber optic cable assembly comprising
   a sleeve surrounding said optical fiber;
   fulcrum means between said sleeve and said optical fiber spaced apart along the length of said optical fiber a predetermined average distance sufficient to facilitate said sufficient bending of said optical fiber between said fulcrum means in response to a load applied to said deflectable wall portion of said envelope to substantially alter the light transmitted through the optical fiber.

7. The load sensing device defined in claim 6, wherein said fulcrum means comprise a spiral fiber wound around said optical fiber and disposed within said sleeve.

8. The load sensing device defined in claim 7, wherein said spiral fiber is wound with a distance between winds in the range of at least twice the diameter of said optical fiber.

9. The load sensing device defined in claim 6, wherein said envelope is made of an elastomeric material and said sleeve is made of a material which is deformable but relatively stiffer than said elastomeric material of said envelope to facilitate said sufficent bending of said optical fiber between said fulcrum means when a load is applied to said envelope.

10. The load sensing device defined in claim 2, wherein said substantial alteration of said light passing through said optical fiber is an attenuation which is substantially linear in response to the magnitude of the applied load.

11. The load sensing device defined in claim 2, wherein said substantial alteration of said light is substantially complete attenuation of the amount of light passing through said optical fiber in response to the applied load.

12. The load sensing device defined in claim 2, wherein said interior surface of said deflectable wall portion is substantially flat when undeformed.

13. The load sensing device defined in claim 2, wherein said envelope is formed of an elastomeric material.

14. The load sensing device defined in claim 2, wherein said fiber optic cable is U-shaped within said envelope.

15. The load sensing device defined in claim 2, wherein said region of said envelope adapted to receive a load includes an upper wall having an exterior side, said exterior side including a generally central portion adapted to receive the load to be applied so that the load to be applied will tend to be concentrated in the generally central portion of the exterior side of said upper wall.

16. The load sensing device defined in claim 15, wherein said generally central portion includes a convex exterior bump.

17. The load sensing device defined in claim 16, wherein said exterior side of said upper wall includes substantially horizontally flat exterior portions to the sides of said convex exterior bump.

18. The load sensing device defined in claim 2, wherein said envelope includes exterior retention surfaces adapted to cooperate with and be retained by a frame assembly.

19. The load sensing device defined in claim 18, wherein at least one of said exterior retention surfaces includes an inwardly sloped exterior side surface.

20. The load sensing device defined in claim 2, wherein said preventing means comprises a frame assembly, said frame assembly including frame members adjacent said envelope, said frame members having a vertical height sufficient to prevent said complete compression of said elastomeric insert where said fiber optic cable rests against said elastomeric insert during application of said load.

21. The load sensing device defined in claim 20, wherein said frame assembly includes a member partially extending over at least a portion of said envelope, said member leaving a sufficent portion of envelope exposed to the load to be sensed to permit said sufficient bending of said optical fiber.

* * * * *